United States Patent
Li et al.

(10) Patent No.: US 7,369,317 B2
(45) Date of Patent: May 6, 2008

(54) HEAD-MOUNTED DISPLAY UTILIZING AN LCOS PANEL WITH A COLOR FILTER ATTACHED THEREON

(75) Inventors: Kuo-Yuin Li, Hsinhua (TW); Jinn-Chou Yoo, Hsinhua (TW)

(73) Assignee: Himax Technologies, Inc., Tainan County (TW)

( * ) Notice: Subject to any disclaimer, the term of this patent is extended or adjusted under 35 U.S.C. 154(b) by 107 days.

(21) Appl. No.: 11/072,291

(22) Filed: Mar. 7, 2005

(65) Prior Publication Data

US 2006/0198027 A1   Sep. 7, 2006

(51) Int. Cl.
*G02B 27/14* (2006.01)
*G03B 21/26* (2006.01)
*G09G 5/00* (2006.01)

(52) U.S. Cl. .................. 359/630; 359/631; 353/28; 345/7; 345/9

(58) Field of Classification Search ................ 359/630, 359/629, 631, 633; 353/28, 30, 98; 345/7–9
See application file for complete search history.

(56) References Cited

U.S. PATENT DOCUMENTS

| 6,379,009 B1 * | 4/2002 | Fergason ..................... 353/28 |
| 6,587,269 B2 * | 7/2003 | Li ............................... 359/497 |
| 7,215,391 B2 * | 5/2007 | Kuan et al. ................. 349/106 |

* cited by examiner

*Primary Examiner*—Ricky Mack
*Assistant Examiner*—Jack Dinh
(74) *Attorney, Agent, or Firm*—Birch, Stewart, Kolasch & Birch, LLP

(57) ABSTRACT

Display apparatus such as a see-through head-mounted display (HMD) through which a viewer could capture a scene while seeing an object through the apparatus is disclosed. In the display apparatus, a liquid crystal on silicon (LCOS) panel with a color filter attached to the LCOS panel is utilized. Accordingly, the compactness, light weight and low cost requirements can be met.

6 Claims, 1 Drawing Sheet

HEAD-MOUNTED DISPLAY UTILIZING AN LCOS PANEL WITH A COLOR FILTER ATTACHED THEREON

BACKGROUND OF THE INVENTION

1. Field of the Invention

The present invention relates to display apparatus, and more particularly to a see-through head-mounted display (HMD) utilizing a liquid crystal on silicon (LCOS) panel and a color filter attached on the LCOS panel.

2. Description of the Prior Art

A see-through head-mounted display (HMD) is an optical device in which the see-through HMD is optically opaque with respect to real world and an image of the real world acquired by head-mounted camera is combined with a virtual or graphic image before being displayed. The see-through HMD has a beneficial effect on our living, education, training, and entertainment.

Conventional see-through HMD adopt liquid crystal display (LCD) that is illuminated from behind by fluorescent lamps, such as the display panels of notebook computers. While compactness, light weight and low cost are major considerations for the see-through HMDs, a need for an improved see-through HMD has arisen, such as to meet the mentioned requirements.

SUMMARY OF THE INVENTION

In view of the foregoing, it is an object of the present invention to provide a compact, lightweight and low-cost see-through HMD.

According to the present invention, a display apparatus and particularly a see-through head-mounted display utilizes a liquid crystal on silicon (LCOS) panel and a color filter attached on the LCOS panel. In one embodiment, the display apparatus includes an optical device, such as beam splitting device, for separating an incoming light into two polarized beams. One of the polarized beams reaches the viewer's eyes directly, and another polarized beam is captured by an image detector and is projected to the viewer's eyes through the LCOS panel and the color filter attached on the LCOS panel.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
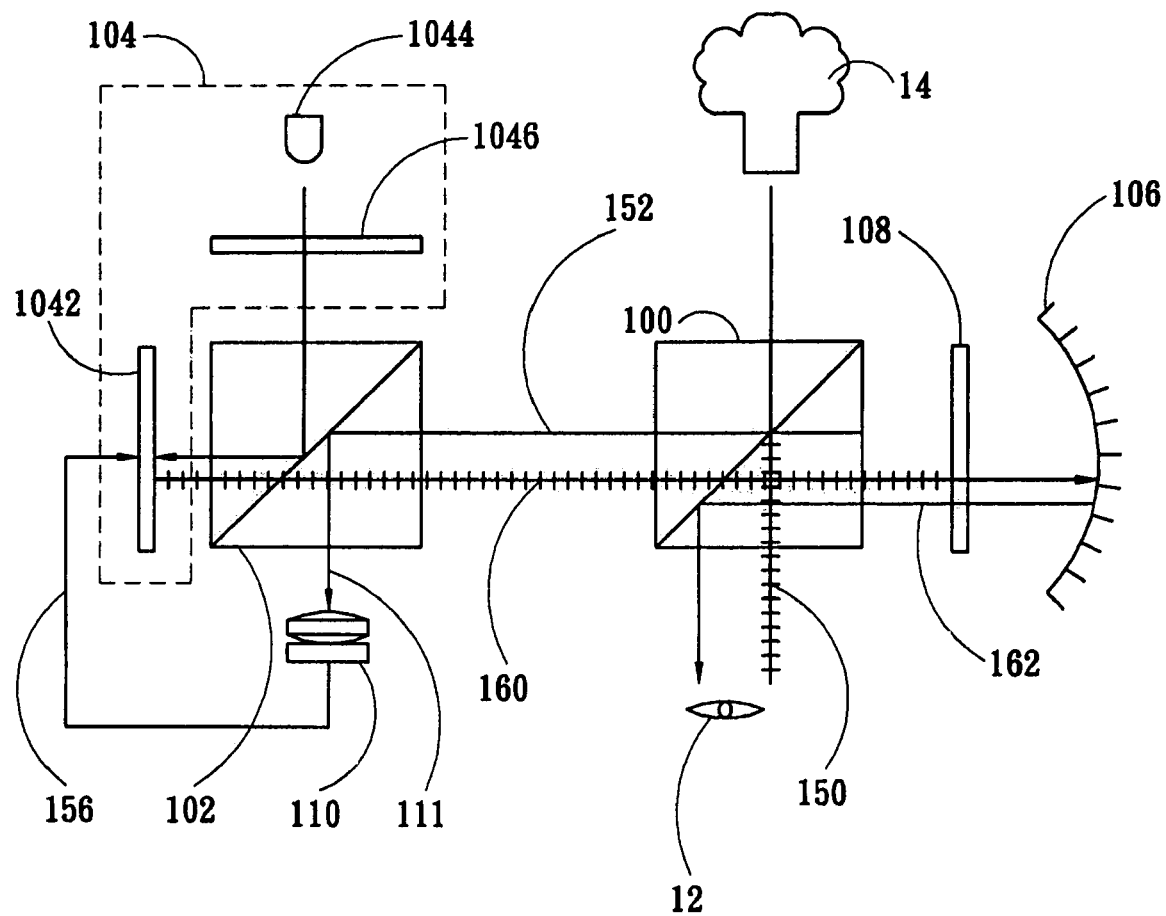
FIG. 1 shows a schematic diagram illustrating a see-through head-mounted display (HMD) according to one embodiment of the present invention.

The preferred embodiment of the present invention will be described in detail in the following. However, besides the detailed description, the present invention can also be applied widely in other embodiments and the scope of the present invention is only limited by the appended claims.

FIG. 1 shows a schematic diagram illustrating a see-through head-mounted display (HMD) 10 according to one embodiment of the present invention. While a see-through head-mounted display is exemplified, it is appreciated that the present invention could be applied to display devices other than the head-mounted displays. Moreover, the arrangement of the present invention could be adapted to other products or functions, such as cameras.

As a viewer (as represented by an eye 12) views an object 14 in front of the viewer 12 through the see-through head-mounted display (HMD) 10, an optical beam splitting device, such as a polarized beam splitter (PBS) 100, is utilized to separate the incoming light beam into two polarized beams. Specifically, the incoming beam from the object 14 is directed onto the PBS 100 and is separated into a parallel polarized light (p-light) 150 and a perpendicular polarized light (s-light) 152. The former 150 passes through the semi-reflecting surface on the hypotenuse of the PBS 100 and further into the viewer's eye 12, and the latter 152 reflects from the semi-reflecting surface of the PBS 100 and propagates toward another PBS 102. The PBS 100 and 102 used in this embodiment are cube-type beam splitting device made of a pair of right-angle prisms joined together with a semi-reflecting surface on the hypotenuse of one prism. It is appreciated that beam splitting devices other than the cube-type PBS could also be used.

The perpendicular polarized light (s-light) 152 reflected from the PBS 100 is directed onto the PBS 102 and is further reflected to passes though the lens 111 and finally to an image sensor or detector 110. In this embodiment, the image sensor 110 is part of a head-mounted camera, which could be made of charge-coupled devices (CCDs) or complimentary-metal-oxide-semiconductor (CMOS) sensors, through which the optical light is detectably converted into an electrical signal, such process is also known as the capture of an image. The detected signals could be further processed or modified according to specific application, and is not depicted here.

The detected signals (or processed signals) 156 are input to an image display module 104. In the present embodiment, the image display module 104 primarily includes an LCOS panel 1042 with a color filter attached thereon, a light source 1044 such as a light-emitting diode (LED) or a cold cathode ray tube, and a polarizer 1046. Specifically, the color filter (CF) attached to the surface of the LCOS panel 1042 may consist of three or more primary color such as RGB and is provided for respectively emitting red, green, blue (RGB) light components of the processed signals 156, with their combination forming a color image. Compared with the conventional see-through head-mounted display (HMD), the LCOS panel 1042 with the color filter attached thereon of the present invention could enjoy more compactness, light weight and low cost due to the fluorescent lamps and complicated optical system.

The light source 1044 emits light, which is polarized by a polarizer 1046 and is further directed onto and reflected from the PBS 102. As shown in FIG. 1, the polarized light is a perpendicular polarized light (s-light) and is used to provide the light source for the LCOS panel 1042 with the color filter attached thereon, which is categorized as a reflective-type display panel. The polarized light is further polarized by the LCOS panel 1042, and the reflected light from the LCOS panel 1042 is a parallel polarized light (p-light), which propagates through the PBSs 102 and 100, and encounters a quarter wavelength plate (QWP) 108, which delays the incident light for a quarter of its wavelength, becoming a perpendicular polarized light (s-light). This light is reflected by a mirror 106, and further passes through the quarter wavelength plate (QWP) 108. Finally, this light 162 (or usually called virtual light) is reflected again by the PBS 100, and reaches the viewer's eye 12. The resultant virtual image is augmented or added on the see-through image 150.

Accordingly, the present invention discloses a display device, such as a see-through HMD, for capturing an image to generate a virtual image superimposed on the scene of a viewer while looking through the display device. A LCOS panel with associated color filter is used to meet the compactness, light weight and low cost requirements.

Although specific embodiments including the preferred embodiment have been illustrated and described, it will be appreciated by those skilled in the art that various modifications may be made without departing from the scope of the present invention, which is intended to be limited solely by the appended claims.

What is claimed is:

1. Display apparatus through which a viewer sees an object in front of the apparatus. said apparatus comprising:
   an optical device for separating an incoming light from the object into a plurality of polarized beams, one of said beams reaching the viewer's eye;
   an image detector for capturing another of said polarized beams and converting said received beam into an electrical signal;
   a liquid crystal on silicon (LCOS) panel with a color filter attached to the liquid crystal on silicon (LCOS) panel for receiving the electrical signal and projecting into the viewer's eye a virtual image based on the electric signal;
   a light source; and
   a polarizer for polarizing light emitted from the light source,
   wherein said optical comprises a first beam splitting device, which separates the incoming light into a parallel polarized light reaching the viewer's eye, and a perpendicular polarized light, wherein said optical device further comprises a second beam splitting device, which receives and reflects the perpendicular polarized light from the first beam splitting device to said image detector, and wherein said polarized light is reflected by the second beam splitting device and is directed onto the liquid crystal on silicon (LCOS) panel.

2. The apparatus according to claim 1, wherein said polarized light is further polarized by the liquid crystal on silicon (LCOS) panel.

3. The apparatus according to claim 2, further comprising:
   a quarter wavelength plate (QWP) for delaying the polarized light from the liquid crystal on silicon (LCOS) panel for a quarter of wavelength; and
   a mirror for reflecting the delayed polarized light,
   wherein the reflected delayed polarized light reenters the quarter wavelength plate (QWP), and is reflected by the first beam splitting device, and finally roaches the viewer's eye.

4. A see-through head-mounted display, comprising:
   a first beam splitting device, which separates an incoming light into a parallel polarized light reaching a viewer's eye, and a perpendicular polarized light;
   a second beam splitting device, which receives and reflects the perpendicular polarized light from the first beam splitting device;
   an image detector for capturing the reflected perpendicular polarized light and converting into an electrical signal;
   a liquid crystal on silicon (LCOS) panel with a color filter attached to the liquid crystal on silicon (LCOS) panel for receiving the electrical signal and emitting to the viewer's eye a virtual image based on the electric signal;
   a light source; and
   a polarizer for polarizing light emitted from the light source, wherein said polarized light is reflected by the second beam splitting device and is directed onto the liquid crystal on silicon (LCOS) panel.

5. The display according to claim 4, wherein said polarized light is further polarized by the liquid crystal on silicon (LCOS) panel.

6. The display according to claim 5, further comprising:
   a quarter wavelength plate (QWP) for delaying the polarized light from the liquid crystal on silicon (LCOS) panel for a quarter of wavelength; and
   a mirror for reflecting the delayed polarized light,
   wherein the reflected delayed polarized light reenters the quarter wavelength plate (QWP), and is reflected by the first beam splitting device, and finally reaches the viewer's eye.

* * * * *